Sept 10, 1957 E. H. MEIER 2,806,209
AMPLITUDE-MODULATED VIDEO PULSE GENERATOR
Filed June 24, 1954
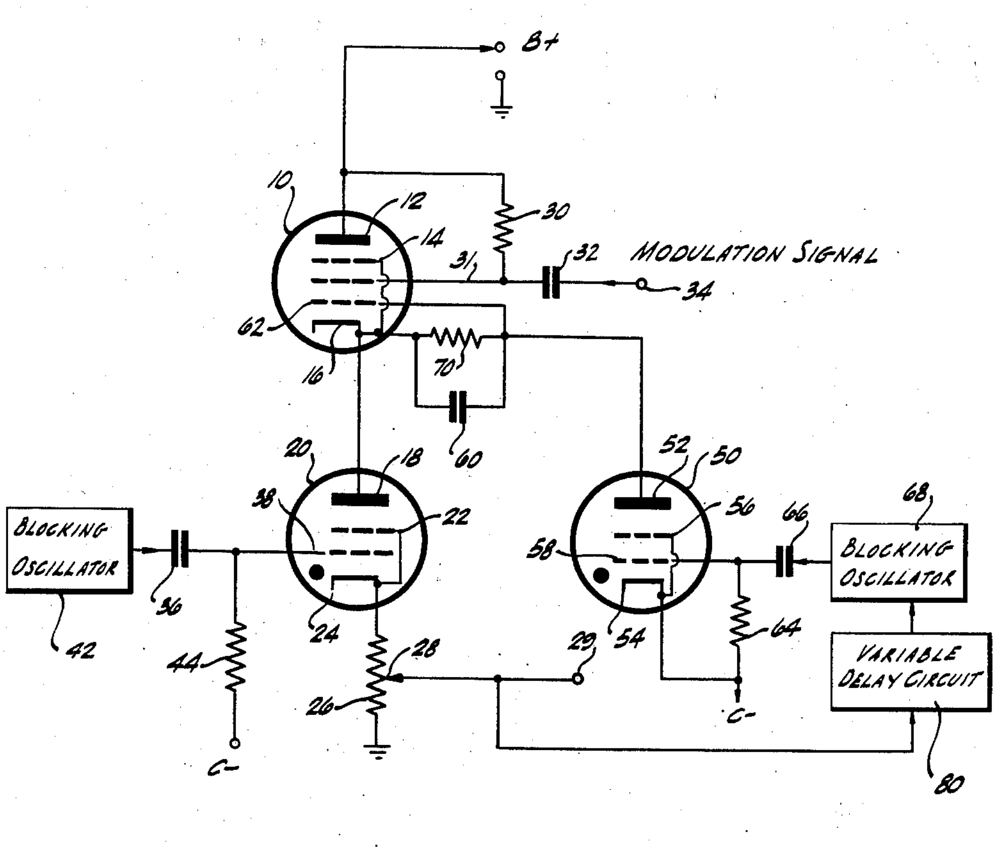
INVENTOR.
EDWIN H. MEIER,
BY
Henry Hyman
ATTORNEY.

2,806,209
Patented Sept. 10, 1957

2,806,209

AMPLITUDE-MODULATED VIDEO PULSE GENERATOR

Edwin H. Meier, Los Angeles, Calif., assignor to Hughes Aircraft Company, Culver City, Calif., a corporation of Delaware Application June 24, 1954, Serial No. 439,056

5 Claims. (Cl. 332—9)

This invention relates to pulse generators, and more particularly to a pulse generator suitable for producing amplitude-modulated video pulses to simulate operation of a pulse receiving system.

In performing tests on radar or object-locating systems that obtain tracking information by conical scanning of the antenna pattern, a video pulse generator containing means for modulating the pulse amplitude is needed to simulate a typical received signal. Such a pulse generator allows testing of the system in the absence of an actually received signal. The amplitude-modulated video pulse may be used directly to provide a signal to a scan modulation detection circuit or to drive an intermediate frequency source adapted to transfer the modulation information to the intermediate frequency pulse for application through the intermediate frequency amplifier of the system.

It is therefore an object of this invention to provide a simple and reliable circuit for producing video pulses typical of those received by radio frequency echo receiving systems.

It is a further object of this invention to provide a video pulse generator having means for amplitude-modulating said video pulses in accordance with an applied signal to simulate pulses received by radio frequency or similar echo receiving systems.

A simulated amplitude-modulated video pulse is obtained by initially triggering a blocking oscillator which, in turn, fires a first thyratron. The current flow through the first thyratron produces a step voltage across its cathode resistor. Amplitude modulation of the step voltage is achieved by having a variable load resistor in the plate circuit of the first thyratron whose resistance varies in accordance with a modulation signal. The current through the cathode resistor and hence the amplitude of the voltage across said resistor will, therefore, be a function of the modulation signal. The resulting step voltage produced across the cathode resistor triggers a second blocking oscillator through a variable delay circuit, said second blocking oscillator pulse in turn firing a second thyratron. The second thyratron opens the plate load circuit of the first thyratron causing the step voltage developed across the cathode resistor to return to zero.

The above enumerated objects and other objects of the invention will become apparent from the following description taken in conjunction with the accompanying drawings made a part of this specification. In the drawings, the single figure is a combined block and circuit diagram of an improved pulse generator in accordance with this invention.

Referring to the Figure 1, a pentode 10 forms part of a voltage divider network between the positive terminal B+ of a direct current voltage supply source (not shown) and ground. The anode 12 of pentode 10 is connected to B+. Its suppressor grid 14 is connected to its cathode 16, the latter also being connected to the plate 18 of a thyratron 20. The cathode 24 of thyratron 20 is connected through a resistor 26 to ground to complete the voltage divider network. Shield grid 22 is connected to cathode 24. As will be made more evident hereafter, the output video pulse is formed across resistor 26 and may be taken off by any suitable means, such as a sliding contact 28 on resistor 26 connected to a terminal 29.

A screen dropping resistor 30 is connected between B+ and the screen grid 31 of tube 10. A coupling capacitor 32 is connected between such screen grid and a terminal 34 for coupling a modulation signal to pentode 10. Any modulation signal applied at terminal 34 will vary the current through pentode 10, thereby effectively varying the resistance of the voltage divider network. This, in turn, varies the amplitude of the video pulse developed across resistor 26.

A coupling capacitor 36 is connected between the control grid 38 of thyratron 20 and a blocking oscillator 42. Oscillator 42 is adapted to supply trigger pulses to control grid 38. A biasing resistor 44 is connected between control grid 38 and a source of negative voltage C— (not shown).

To terminate current flow through thyratron 20, a second thyratron 50, having an anode 52, a cathode 54, a shield grid 56 and a control grid 58, has its anode 52 capacitively coupled, as by a coupling capacitor 60, to the anode 18 of thyratron 20. Anode 52 is further connected to the control grid 62 of pentode 10. Shield grid 56 is connected to cathode 54, the latter further being connected to the source of negative voltage C—. A biasing resistor 64 is connected between control grid 58 and the source of negative voltage C— to provide a negative bias with respect to cathode 54. A coupling capacitor 66 is connected between control grid 58 and a blocking oscillator 68 for applying a triggering pulse from the blocking oscillator 68 to thyratron 50.

A resistor 70 is connected across capacitor 60 for the purpose of terminating conduction through thyratron 50. A variable delay network 80 is inserted between blocking oscillator 68 and the sliding contact 28 of cathode resistor 26 for controlling the duration of the video pulse.

The operation and cooperation of the circuit above described will now be explained. Initially, thyratron 20 and thyratron 50 are biased beyond cut-off. Upon the application of a trigger pulse from blocking oscillator 42 of sufficient amplitude to ionize the gas in thyratron 20 and cause thyratron 20 to fire, pentode 10 becomes serially connected with resistor 26 to complete a direct current path between B+ and ground. Any modulation signal applied to terminal 34 will vary the current through pentode 10 and hence through the resistor 26. The voltage across resistor 26 will be a pulse representing a step function whose amplitude varies in accordance with the current through pentode 10.

Initiating the step voltage across resistor 26 further energizes the variable delay circuit 80, which, after a predetermined delay, triggers blocking oscillator 68. Blocking oscillator 68 applies a positive step voltage to control grid 58 of sufficient amplitude to fire thyratron 50. Thyratron 50 acts as switching means to place the negative voltage source onto the plate of thyratron 20 through capacitor 60, thereby extinguishing thyratron 20. When this occurs, the voltage across resistor 26 drops rapidly to zero. The width of the video pulse thus formed is controlled by the predetermined delay of the delay network 80.

Capacitor 60 and resistor 70 serve to de-ionize thyratron 50. Upon ionization of thyratron 50, the initial current flow through thyratron 50, capacitor 60, and pentode 10 to B+ charges capacitor 60 so that a large negative voltage is placed on the control grid of pentode 10. This causes pentode 10 to stop conducting, thereby opening the current path from negative voltage course C through thyratron 50, resistor 70, and pentode 10 to B+. Thyratron 50 ceases conduction and the circuit is ready for the next triggering pulse from blocking oscillator 42. Between pulses, the charge across capacitor 60 is dissipated through resistor 70, thereby raising the grid bias potential on pentode 10 to a level permitting conduction. Pentode 10 is now ready to function once more as a variable resistor. The waveform of the signal at sliding contact 28 can be picked off at that point.

While there has been here described one embodiment of the present invention, it will be manifest to one skilled in the art that various changes and modifications may be made therein without departing from the spirit of the invention. It is therefore aimed in the appended claims to cover all such changes and modifications as fall within the spirit and scope of the invention.

What is claimed is:

1. A pulse generator for developing amplitude modulated pulses having a predetermined repetition rate comprising a D.-C. voltage supply source; a series circuit including a signal-responsive variable resistance device utilizing an electron discharge device having at least an anode, control grid and cathode, a fixed resistor, and a normally non-conductive thyratron switch, said thyratron switch being connected between said variable resistance device and said fixed resistor, said series circuit being connected across said D.-C. voltage source with said variable resistance device being coupled to said direct current voltage supply source; means adapted to apply a modulation signal to said variable resistance device to vary the resistance thereof; a source of pulses of said predetermined repetition rate, said source of pulses being coupled to said thyratron switch; said thyratron switch being adapted to fire upon the occurrence of said pulses to complete a D.-C. path through said variable resistance device and said fixed resistor, the resistance of said variable resistance device varying in accordance with said modulation signal; and means including delay means and a gaseous discharge device coupled to said electron discharge device, said thyratron switch and said fixed resistor and adapted to extinguish said thyratron switch and to cut off said electron discharge device at a predetermined interval after the switch is fired, whereby the voltage across said fixed resistor appears in the form of pulses whose amplitudes vary in accordance with the modulation signal applied to said variable resistance device, and said gaseous discharge device is also extinguished.

2. A pulse generator for developing amplitude modulated pulses having a predetermined duration and repetition rate, said pulse generator comprising a source of positive voltage; a voltage divider network, said network being coupled to said positive voltage source and including a variable resistive element coupled to said source of positive voltage and a fixed resistive element; an electronic switch, said switch being connected between said fixed and said variable resistive elements; pulse initiation control means coupled to said electronic switch, said pulse initiation control means being adapted to controllably close said electronic switch to permit current to flow through said voltage divider network; modulation control means coupled to said variable resistive element, said modulation control means being adapted to apply a modulation signal to said variable resistive element to vary the resistance of said voltage divider network in accordance with said modulation signal; pulse termination control means including delay means, and thyratron means and being coupled to said electronic switch and said fixed resistive element, said pulse termination control means being adapted to operate in response to the voltage across said network to open said electronic switch after a predetermined duration, thereby halting the flow of current through said voltage divider network, whereby amplitude modulated pulses are produced.

3. A pulse generator as defined in claim 2 wherein said variable resistor of said voltage divider network includes an electron discharge device having at least an anode, a cathode and a control grid, said anode being connected to said positive voltage source, said cathode being connected to said electronic switch, and said control grid being connected to said means for applying a modulation signal to cause the impedance of said electron discharge device to vary in accordance with said modulation signal.

4. A pulse generator for developing amplitude modulated pulses having a predetermined duration and repetition rate, said pulse generator comprising: a source of positive voltage; a voltage divider network, said network being coupled to said positive voltage source and including an electron discharge device having at least an anode, cathode, and control grid, said anode being connected to said positive voltage source, said voltage divider network also including a fixed resistive element; modulation control means coupled to the control grid of said electron discharge device for applying a modulation signal to cause the impedance of said electron discharge device to vary in accordance with said modulation signal; a first thyratron having at least an anode, cathode and control grid, the anode being coupled to the cathode of said electron discharge device and the cathode being coupled to said fixed resistive element; pulse initation control means coupled to the control grid of said first thyratron and arranged controllably to ionize said first thyratron to permit current to flow through said voltage divider network; pulse termination control means including a second thyratron having an anode, cathode, and control grid, the anode being coupled to the anode of said first thyratron and to said electron discharge device, a source of negative voltage coupled to the cathode of said second thyratron; a resistor, a capacitor, said resistor and capacitor being connected in parallel and the parallel combination being serially connected between the anodes of said first and second thyratrons, and means including a delay circuit and a blocking oscillator coupled between said fixed resistive element and the control grid of said second thyratron for applying the voltage across said voltage divider network to the control grid of said second thyratron to ionize said second thyratron and cause the negative voltage source to be placed onto the anode of said first thyratron to render said first thyratron nonconductive, said source of negative voltage further being placed onto the cathode and control grid of said electron discharge device to render said electron discharge device nonconductive whereby said second thyratron is extinguished almost instantaneously after said first thyratron is rendered nonconductive.

5. An amplitude modulated pulse generator comprising: a positive voltage source; an electron discharge device having at least an anode, cathode, and control grid, said anode being coupled to said positive voltage source and said control grid being responsive to modulating signals; a fixed resistive element; a first thyratron having at least an anode, cathode and control grid, said anode being coupled to the cathode of said electron discharge device and said cathode being coupled to said fixed resistive element; means coupled to the control grid of said first thyratron for initiating ionization of said first thyratron; a source of negative voltage; a second thyratron having at least an anode, cathode, and control grid, said second thyratron having its anode coupled to said electron discharge device and its cathode coupled to said source of negative voltage; and means including a delay circuit coupling said fixed resistive element to the control grid of said second thyratron.

References Cited in the file of this patent

UNITED STATES PATENTS

| | | |
|---|---|---|
| 2,428,149 | Falk | Sept. 30, 1947 |
| 2,467,793 | Wheeler | Apr. 19, 1949 |
| 2,632,046 | Goldberg | Mar. 17, 1953 |